US012490005B1

(12) United States Patent
Kim

(10) Patent No.: US 12,490,005 B1
(45) Date of Patent: Dec. 2, 2025

(54) LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/035,575

(22) Filed: Jan. 23, 2025

(30) Foreign Application Priority Data

Sep. 10, 2024 (KR) ........................ 10-2024-0123195

(51) Int. Cl.

| | |
|---|---|
| ***H04R 17/00*** | (2006.01) |
| ***F21S 41/20*** | (2018.01) |
| ***H01R 13/62*** | (2006.01) |
| ***H01R 13/642*** | (2006.01) |
| ***H04R 1/02*** | (2006.01) |
| *F21V 31/00* | (2006.01) |

(52) U.S. Cl.

CPC ............ *H04R 1/028* (2013.01); *F21S 41/285* (2018.01); *H01R 13/6205* (2013.01); *H01R 13/642* (2013.01); *H04R 17/00* (2013.01); *F21V 31/00* (2013.01); *H01R 2201/26* (2013.01); *H04R 2420/09* (2013.01); *H04R 2499/13* (2013.01)

(58) Field of Classification Search

CPC .... H04R 1/028; H04R 17/00; H04R 2420/09; H04R 2499/13; F21S 41/285; H01R 13/6205; H01R 13/642; H01R 2201/26; F21V 31/00

See application file for complete search history.

(56) References Cited

U.S. PATENT DOCUMENTS

| | | | | |
|---|---|---|---|---|
| 11,560,102 B2 * | 1/2023 | Hwang | .................... | H04R 3/04 |
| 2013/0312656 A1 * | 11/2013 | Tatara | .................... | B60Q 5/008<br>116/28 R |
| 2023/0391248 A1 * | 12/2023 | Kim | ....................... | H04R 7/127 |

OTHER PUBLICATIONS

CN 218159604U—A sounding car lamp, 11 pages. (Year: 2025).*

* cited by examiner

*Primary Examiner* — Tuyen K Vo

(74) *Attorney, Agent, or Firm* — NSIP Law

(57) ABSTRACT

A lamp for a vehicle is provided. The lamp includes a lamp housing part including an internal space to accommodate a light source, an outer lens part coupled to one side of the lamp housing part to cover the internal space, a vibration part fixed to the outer lens part, a drive part provided at one side of the vibration part to operate the vibration part by transmitting an electrical signal to the vibration part, and a connection part to electrically connect the vibration part and the drive part. The vibration part includes a polarized piezoelectric element, and first and second electrodes provided to respectively face two opposite sides based on a direction in which the piezoelectric element is polarized. The piezoelectric element outputs a sound by being vibrated by a change over time in voltage applied to the first and second electrodes.

20 Claims, 24 Drawing Sheets

LAMP FOR VEHICLE

CROSS-REFERENCE TO RELATED APPLICATION

This application claims priority to and the benefit under 35 USC § 119 of Korean Patent Application No. 10-2024-0123195, filed in the Korean Intellectual Property Office on Sep. 10, 2024, the entire contents of which are incorporated herein by reference for all purposes.

BACKGROUND

1. Field

The present disclosure relates to a lamp for a vehicle, and more particularly, to a lamp for a vehicle that is capable of outputting a sound.

2. Description of the Related Art

Recently, with the increasing demand for entertainment functions in addition to transportation functions required for vehicles, there has been a growing need for lamps mounted in the vehicles and having additional functions in addition to simple lighting functions. For example, recently, a lamp for a vehicle has additionally adopted a function capable of performing communication with the outside.

In the related art, the lamp for a vehicle has performed the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to add a function which is capable of outputting a sound, to a lamp for a vehicle without affecting performance of the lamp for a vehicle.

In a general aspect of the disclosure, a lamp for a vehicle includes: a lamp housing part including an internal space configured to accommodate a light source; an outer lens part coupled to one side of the lamp housing part and configured to cover the internal space; a vibration part fixed to the outer lens part; a drive part provided at one side of the vibration part and configured to operate the vibration part by transmitting an electrical signal to the vibration part; and a connection part configured to electrically connect the vibration part and the drive part, wherein the vibration part includes: a polarized piezoelectric element; and first and second electrodes provided to respectively face two opposite sides based on a direction in which the piezoelectric element is polarized, wherein the piezoelectric element outputs a sound by being vibrated by a change over time in voltage applied to the first and second electrodes, wherein the connection part includes: a first connection part having one side connected to the vibration part; and a second connection part having one side connected to the drive part, and wherein the first connection part and the second connection part are coupled to each other while being in contact with each other.

The drive part may be fixedly coupled to one side surface of the lamp bezel part.

The drive part may be fixedly coupled to one side surface of the lamp housing part.

The first connection part may include a first connector member, wherein the second connection part may include a second connector member detachably provided on the first connector member.

The first connector member may be provided to face an outer peripheral region of the outer lens part, wherein the second connector member may be provided outside the lamp bezel part.

The first connector member may be fixed to an outer peripheral region of the outer lens part.

The first connector member may be provided to face an outer peripheral region of the outer lens part, wherein the outer lens part may include: a first outer lens region having a transmittance rate for visible rays that is a first transmittance rate; and a second outer lens region having a transmittance rate for visible rays that is a second transmittance rate lower than the first transmittance rate, wherein the first connection part may further include a first wire member configured to connect the first connector member and the vibration part, and wherein the first wire member may be provided to face the second outer lens region.

The second connector member may be provided outside the lamp bezel part, wherein a hole region may be formed in the lamp bezel part, wherein the second connection part may further include a second wire member configured to connect the second connector member and the drive part, and wherein the second wire member may penetrate the hole region.

The first connection part may include a terminal member connected to the vibration part, wherein the second connection part may include a pin member configured to come into contact with the terminal member.

The second connection part may further include a spring member configured to press the pin member toward the terminal member.

The pin member may be fixedly coupled to the drive part.

The first connection part may include a terminal member connected to the vibration part, wherein the second connection part may include an elastic pin member configured to come into contact with the terminal member and having an elastically deformable geometric shape.

The elastic pin member may include a bent band shape, wherein the band may include: a first band region fixed to the drive part; and a second band region having a shape bent from the first band region, wherein the second band region may be configured to come into contact with the terminal member.

The first connection part may include a first coupling member having a first magnet region, wherein the second connection part may include a second coupling member having a second magnet region configured to be attached to the first magnet region by a magnetic force.

The first coupling member may be provided to face an outer peripheral region of the outer lens part, wherein the second coupling member may be provided outside the lamp bezel part.

The first coupling member may be fixed to an outer peripheral region of the outer lens part.

The first coupling member may be provided to face an outer peripheral region of the outer lens part, wherein the outer lens part may include: a first outer lens region having a transmittance rate for visible rays that is a first transmittance rate; and a second outer lens region having a transmittance rate for visible rays that is a second transmittance rate lower than the first transmittance rate, wherein the first connection part may further include a first wire member configured to connect the first coupling member and the vibration part, and wherein the first wire member may be provided to face the second outer lens region.

A first concave-convex region having a concave-convex shape may be provided in a region of the first coupling member facing the second coupling member, wherein a second concave-convex region having a shape corresponding to the first concave-convex region, may be provided in a region of the second coupling member facing the first coupling member, wherein the first concave-convex region and the second concave-convex region may be coupled to engage with each other.

The lamp may further include: a connection identification terminal member provided at one side of the vibration part; and a grounding part electrically connected to the connection identification terminal member, wherein the grounding part may be either provided in the vibration part or outside the vibration part.

In another general aspect of the disclosure, a lamp for a vehicle, includes: a lamp housing part including an internal space configured to accommodate a light source; an outer lens part coupled to one side of the lamp housing part and configured to cover the internal space; a vibration part fixed to the outer lens part; a drive part provided at one side of the vibration part; a connection part configured to electrically connect the vibration part and the drive part; and a controller configured to control the drive part to operate the vibration part; wherein the vibration part includes: a polarized piezoelectric element; and first and second electrodes provided to respectively face two opposite sides based on a direction in which the piezoelectric element is polarized, wherein the piezoelectric element outputs a sound by being vibrated by a change over time in voltage applied to the first and second electrodes, wherein the connection part includes: a first connection part having one side connected to the vibration part; and a second connection part having one side connected to the drive part, and wherein the first connection part and the second connection part are coupled to each other while being in contact with each other.

According to the present disclosure, it is possible to add the function, which is capable of outputting a sound, to the lamp for a vehicle without affecting the performance of the lamp for a vehicle.

DETAILED DESCRIPTION

Hereinafter, a lamp for a vehicle according to the present disclosure will be described.

Figure 1:
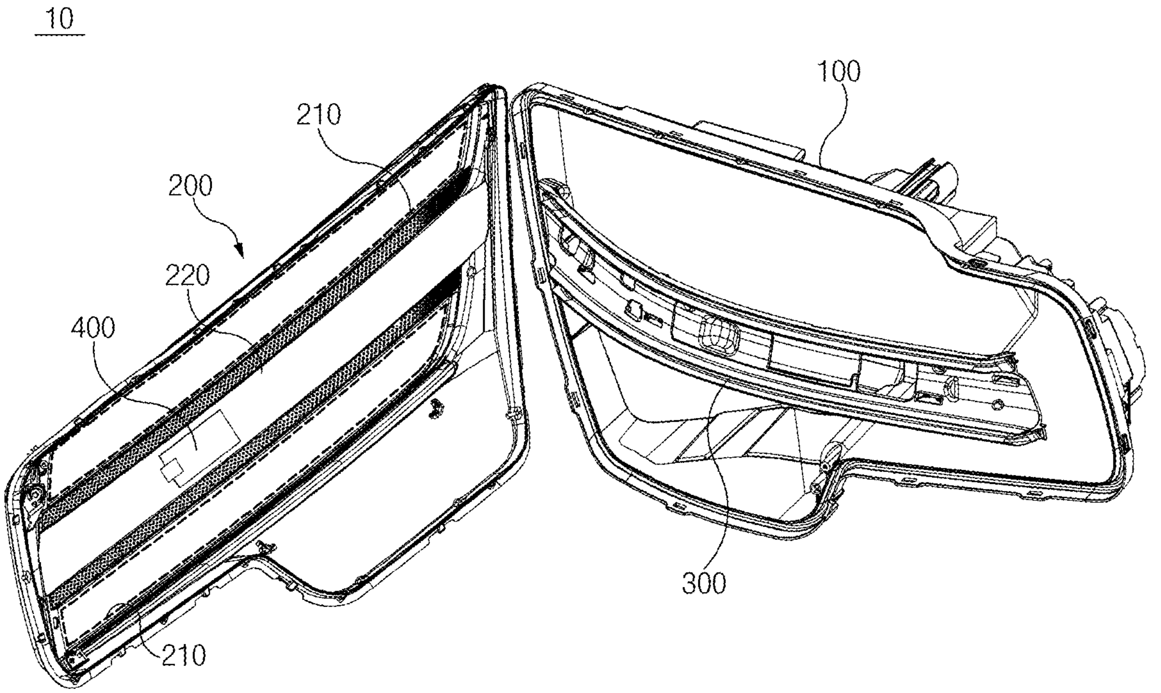
FIG. 1 is a view illustrating a state in which an outer lens part is spaced apart from a lamp housing part and a lamp bezel part in a lamp for a vehicle according to an example of the present disclosure.
Figure 2:
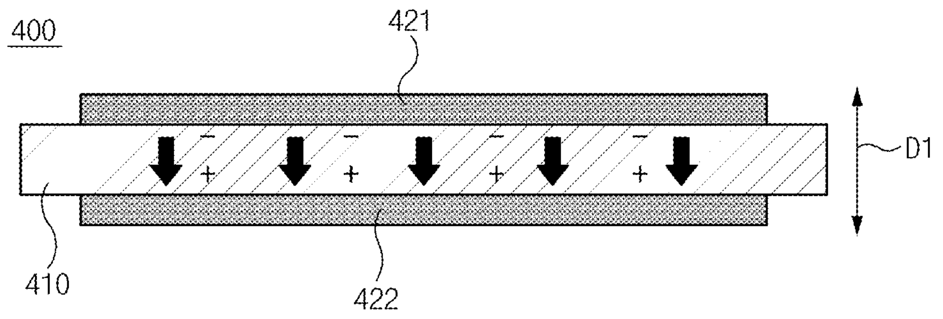
FIG. 2 is a cross-sectional view of a vibration part of the lamp for a vehicle according to the present disclosure, i.e., a view illustrating a state made before power is provided to an electrode.
Figure 3:
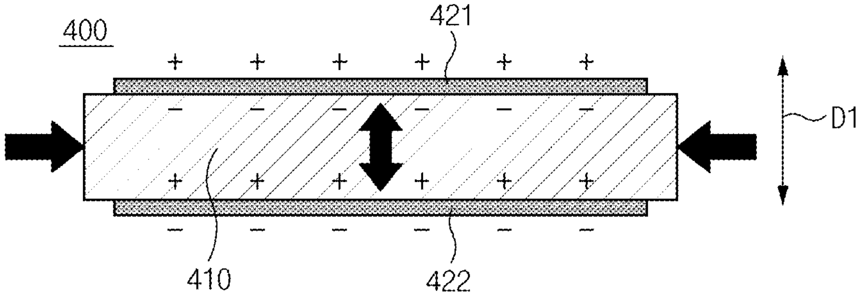
FIG. 3 is a cross-sectional view of the vibration part of the lamp for a vehicle according to the present disclosure, i.e., a view illustrating one state made after power is provided to the electrode.
Figure 4:
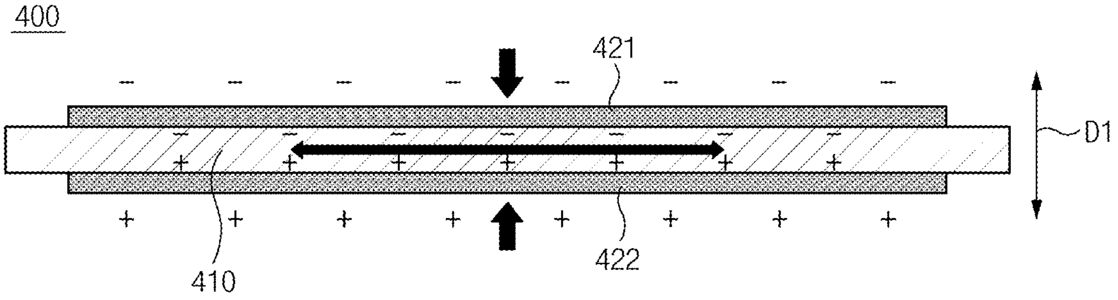
FIG. 4 is a cross-sectional view of the vibration part of the lamp for a vehicle according to the present disclosure, i.e., a view illustrating another state made after power is provided to the electrode.

FIG. 1 is a view illustrating a state in which an outer lens part is spaced apart from a lamp housing part and a lamp bezel part in a lamp for a vehicle according to an example of the present disclosure, and FIG. 2 is a cross-sectional view of a vibration part of the lamp for a vehicle according to the present disclosure, i.e., a view illustrating a state made before power is provided to an electrode. FIG. 3 is a cross-sectional view of the vibration part of the lamp for a vehicle according to the present disclosure, i.e., a view illustrating one state made after power is provided to the electrode, and FIG. 4 is a cross-sectional view of the vibration part of the lamp for a vehicle according to the present disclosure, i.e., a view illustrating another state made after power is provided to the electrode.

With reference to FIGS. 1 and 2, a lamp 10 for a vehicle (hereinafter, referred to as a 'lamp') according to the present disclosure may include a lamp housing part 100 having an internal space configured to accommodate a light source, and an outer lens part 200 coupled to one side of the lamp housing part 100 and configured to cover the internal space. More specifically, the outer lens part 200 may be fixedly coupled to the lamp housing part 100. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the lamp housing part 100 or the outer lens part 200.

In order to achieve the above-mentioned object, the lamp 10 according to the present disclosure may include a vibration part 400 fixed to the lamp housing part 100 or the outer lens part 200. The vibration part 400 may be configured to output a sound by vibrating the lamp housing part 100 or the outer lens part 200. For example, as illustrated in FIG. 1, the vibration part 400 may be fixed to the outer lens part 200. However, unlike the configuration illustrated in FIG. 1, the vibration part 400 may be fixed to the lamp housing part 100. Meanwhile, the vibration part 400 may be accommodated in the internal space formed in the lamp housing part 100.

With continued reference to FIG. 1, the lamp 10 according to the present disclosure may further include a lamp bezel part 300 having one side fixedly coupled to the lamp housing part 100, the lamp bezel part 300 being provided to at least partially face the outer lens part 200. More specifically, based on FIG. 1, one region of the outer lens part 200 may face the lamp bezel part 300 in case that the outer lens part 200 is assembled to the lamp housing part 100.

Meanwhile, the vibration part 400 of the lamp 10 according to the present disclosure may include a polarized piezoelectric element 410. That is, according to the present disclosure, the vibration part 400 may include the piezoelectric element 410 in a polarized state in which one side thereof is positively charged and the other side thereof is negatively charged unless a temperature becomes a Curie temperature or higher or exceeds a predetermined range and a reverse voltage is applied in a direction opposite to a direction of an electric field in the piezoelectric element. Any material may be used for the piezoelectric element 410 without limitation as long as the material can be polarized. For example, the piezoelectric element 410 may be made of a ceramic material. Meanwhile, in the present specification, as illustrated in FIGS. 2 to 4, a direction in which a positively charged region and a negatively charged region face each other in the piezoelectric element 410 is defined as a direction in which the piezoelectric element is polarized.

With continued reference to FIGS. 2 to 4, the lamp 10 according to the present disclosure may include a first electrode 421 and a second electrode 422 that are provided to respectively face two opposite sides based on the direction in which the piezoelectric element 410 is polarized. That is, the first electrode 421 and the second electrode 422 may be provided to respectively face or be in contact with the negatively charged region and the positively charged region in the piezoelectric element 410.

A process in which the lamp 10 according to the present disclosure outputs a sound will be described below. When power is supplied to the first electrode 421 and the second electrode 422 through a power supply part to be described below, the first electrode 421 and the second electrode 422 are charged. In particular, when power with alternating current is supplied to the first electrode 421 and the second electrode 422, voltages of the first electrode 421 and the second electrode 422 vary over time. Therefore, according to the present disclosure, an electric force applied to the piezoelectric element 410 by the first electrode 421 and the second electrode 422 also varies over time as voltages applied to the first electrode 421 and the second electrode 422 vary over time, such that the piezoelectric element 410 performs motions in a longitudinal direction thereof and a width direction thereof. The motions are converted into vibration of the piezoelectric element 410, and the lamp housing part 100 or the outer lens part 200 is vibrated by the vibration of the piezoelectric element 410, thereby outputting a sound to the outside. For example, as illustrated in FIG. 2, before power is supplied to the first electrode 421 and the second electrode 422, the first electrode 421 and the second electrode 422 are not electrified, such that an external force is not applied to the piezoelectric element 410. Then, as illustrated in FIG. 3, when a first time elapses after power is supplied to the first electrode 421 and the second electrode 422, the first electrode 421 and the second electrode 422 are positively and negatively charged, respectively, such that the piezoelectric element 410 expands in a thickness direction thereof while receiving forces in directions toward the first electrode 421 and the second electrode 422. Then, as illustrated in FIG. 4, when a second time elapses after the power is supplied to the first electrode 421 and the second electrode 422, the first electrode 421 and the second electrode 422 are negatively and positively charged, respectively, such that the piezoelectric element 410 contracts in the thickness direction thereof while receiving forces in directions away from the first electrode 421 and the second electrode 422. Thereafter, the states illustrated in FIGS. 2 to 4 are repeated, such that the piezoelectric element 410 vibrates. That is, according to the present disclosure, the piezoelectric element 410 vibrates as voltages applied to the first electrode 421 and the second electrode 422 vary over time, such that the vibration part 400 may output a sound.

Meanwhile, with reference back to FIG. 1, in addition, according to the present disclosure, the vibration part 400 may be provided at a position in the lamp 10 at which the vibration part 400 may be protected from external direct sunlight. More specifically, the vibration part 400 may be fixed to a region of the outer lens part 200 or the lamp housing part 100 in which visible ray permeability is low. For example, as illustrated in FIG. 1, in case that the vibration part 400 is fixed to the outer lens part 200, the outer lens part 200 may include a first outer lens region 210 having a transmittance rate for visible rays, i.e., a first transmittance rate, and a second outer lens region 220 having a transmittance rate for visible rays, i.e., a second transmittance rate lower than the first transmittance rate, and the vibration part 400 may be fixed to the second outer lens region 220. More specifically, the second outer lens region 220 may be made of a material having impermeability for visible rays. Therefore, the light emitted from the lamp 10 may not pass through the second outer lens region 220. In contrast, in case that the vibration part 400 is fixed to the lamp housing part 100, the vibration part 400 may be fixed to a lower region of an inner surface of the lamp housing part 100. In this case, the sound generated by the vibration of the vibration part 400 may propagate in a forward/rearward direction through a lower side of the lamp, i.e., a lower side of the vehicle. Meanwhile, the piezoelectric element 410, which constitutes the vibration part 400, may have a plate shape.

Figure 5:
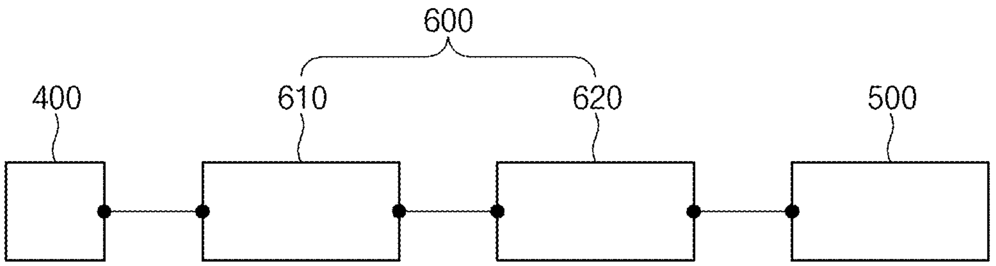
FIG. 5 is a view schematically illustrating a connection relationship between the vibration part, a drive part, and a connection part of the lamp for a vehicle according to the present disclosure.

FIG. 5 is a view schematically illustrating a connection relationship between the vibration part, a drive part, and a connection part of the lamp for a vehicle according to the present disclosure.

With reference to FIG. 5, the lamp 10 according to the present disclosure may include a drive part 500 provided at one side of the vibration part 400 and configured to operate the vibration part 400 by transmitting an electrical signal to the vibration part 400, and a connection part 600 configured to electrically connect the vibration part 400 and the drive part 500. That is, according to the present disclosure, the electrical signal transmitted from the drive part 500 may be transmitted to the vibration part 400 through the connection part 600, such that the vibration part 400 may output a sound corresponding to the electrical signal on the basis of the above-mentioned principle. For example, a controller (e.g., a processor such as the ECU (Electronic Control Unit)) may be configured to control the drive part 500 to operate the vibration part 400.

Meanwhile, according to the present disclosure, the connection part 600 may be divided into a plurality of components. More specifically, as illustrated in FIG. 5, the connection part 600 may include a first connection part 610 having one side connected to the vibration part 400, and a second connection part 620 having one side connected to the drive part 500. In this case, the first connection part 610 and the second connection part 620 may be coupled to each other while being in contact with each other. More specifically, according to the present disclosure, the first connection part 610 and the second connection part 620 may be electrically connected to each other.

Figure 6:
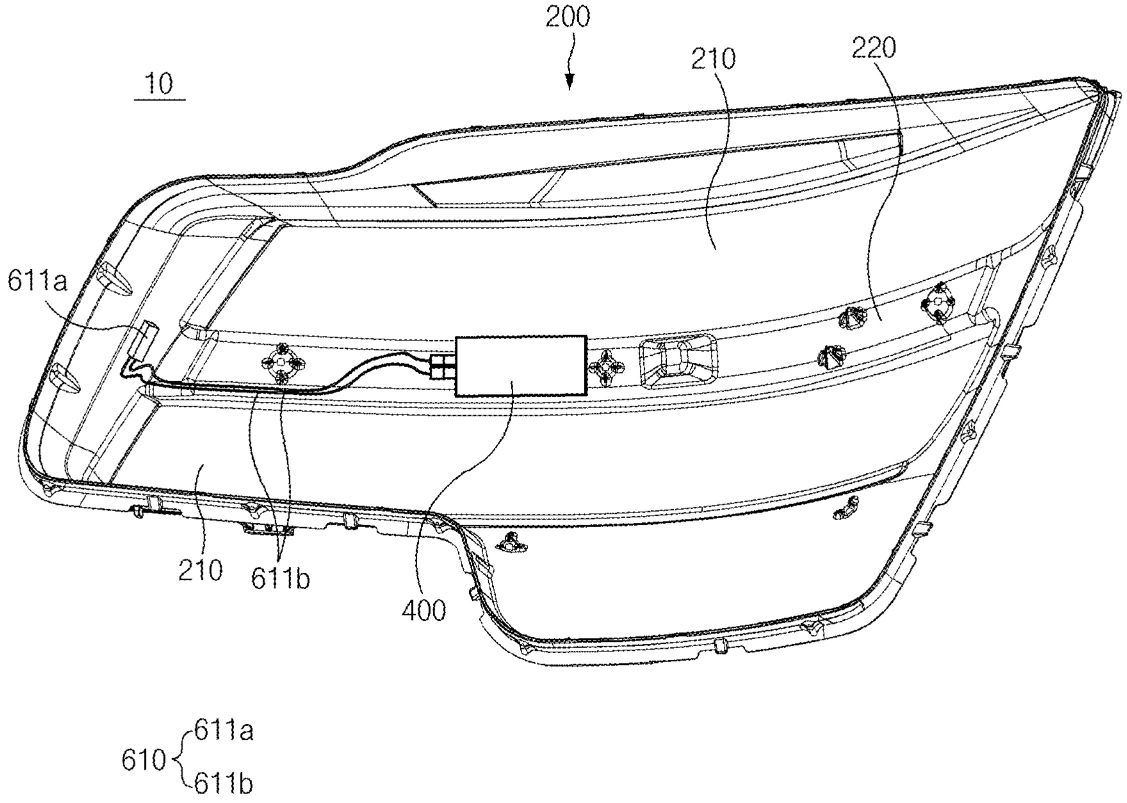
FIG. 6 is a view illustrating an outer lens part, a vibration part, and a first connection part of a lamp for a vehicle according to a first embodiment of the present disclosure.
Figure 7:
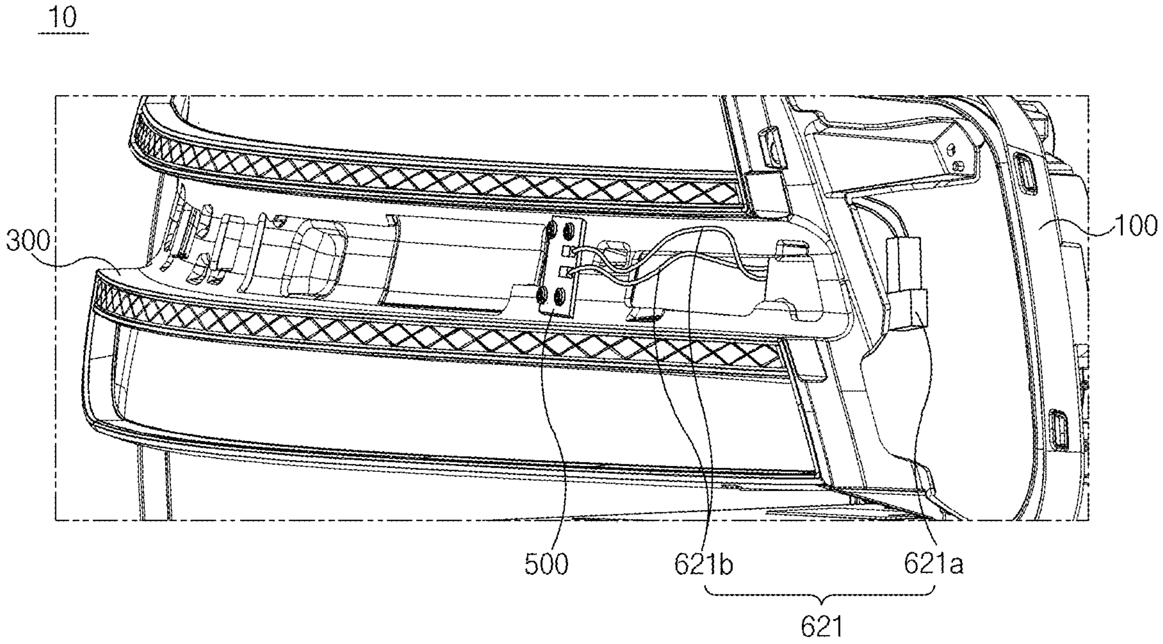
FIG. 7 is a view illustrating a lamp housing part, a lamp bezel part, a drive part, and a second connection part of the lamp for a vehicle according to the first embodiment of the present disclosure.
Figure 8:
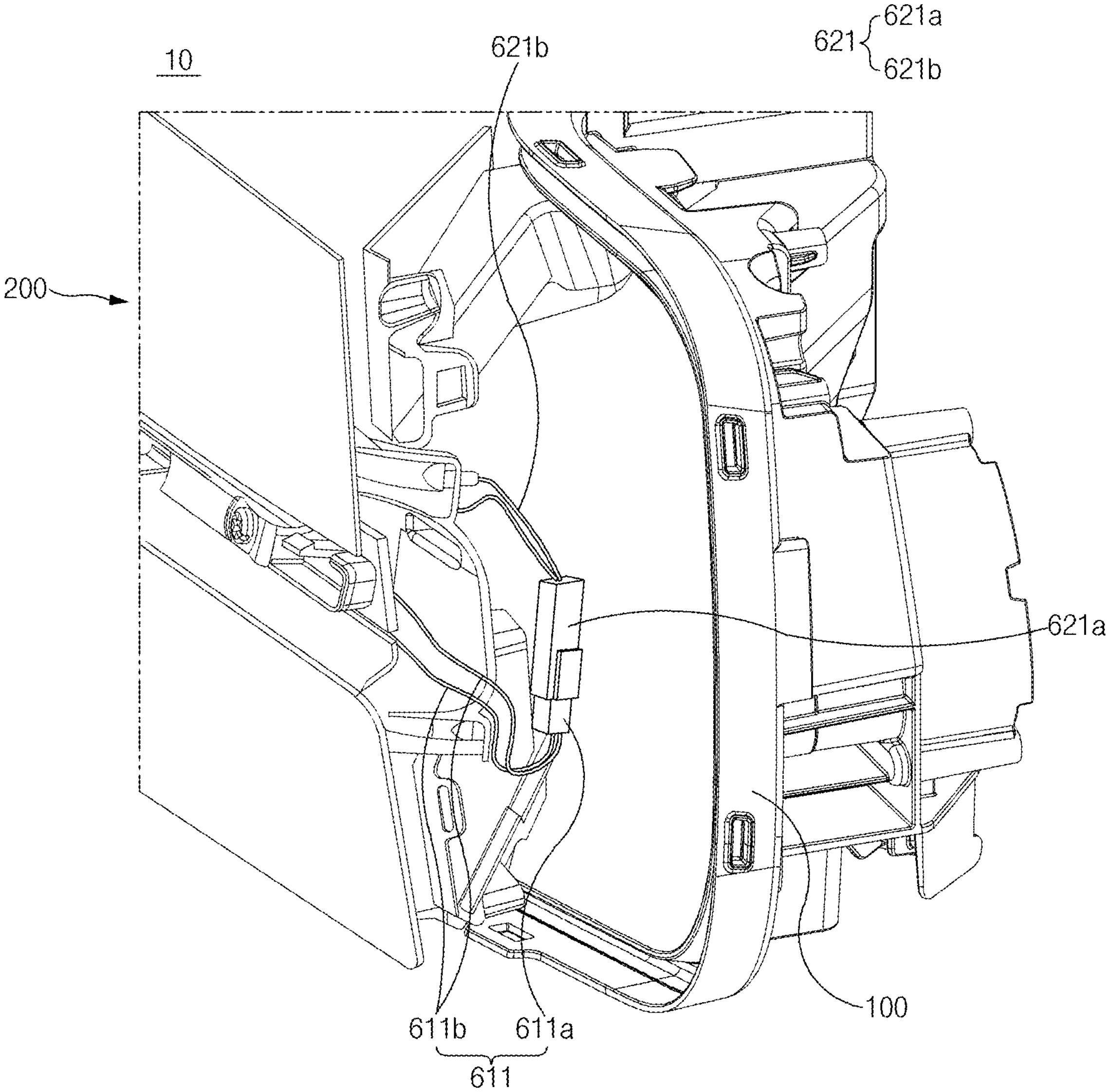
FIG. 8 is an enlarged view illustrating a state in which the first connection part and the second connection part according to the first embodiment of the present disclosure are coupled.

FIG. 6 is a view illustrating an outer lens part, a vibration part, and a first connection part of a lamp for a vehicle according to a first embodiment of the present disclosure, and FIG. 7 is a view illustrating a lamp housing part, a lamp bezel part, a drive part, and a second connection part of the lamp for a vehicle according to the first embodiment of the present disclosure. FIG. 8 is an enlarged view illustrating a state in which the first connector member and the second connector member according to the first embodiment of the present disclosure are coupled, and FIG. 9 is an enlarged view illustrating the first connector member and the second connector member according to the first embodiment of the present disclosure.

As illustrated in FIGS. 6 to 9, the drive part 500 may be fixedly coupled to one side surface of the lamp bezel part 300. However, as described below, the drive part 500 may be fixedly coupled to one side surface of the lamp housing part 100.

Figure 9:
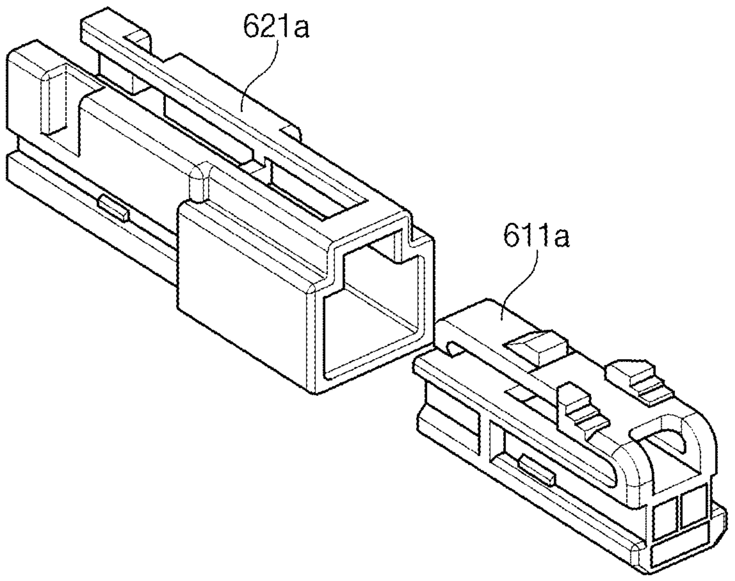
FIG. 9 is an enlarged view illustrating the first connection part and the second connection part according to the first embodiment of the present disclosure.

Meanwhile, with reference to FIGS. 6 to 9, in the first embodiment of the present disclosure, the first connection part 610 may include a first connector member **611*a*, and the second connection part 620 may include a second connector member 621*a* detachably provided on the first connector member 611*a*. More specifically, any one of the first connector member 611*a* and the second connector member 621*a* may be inserted into the other of the first connector member 611*a* and the second connector member 621*a*. For example, as illustrated in FIGS. 8 and 9, the first connector member 611*a* may be inserted into the second connector member 621*a***.

More specifically, according to the first embodiment of the present disclosure, the first connector member **611*a* may be provided to face an outer peripheral region of the outer lens part 200, and the second connector member 621*a* may be provided outside the lamp bezel part 300. For example, the first connector member 611*a* may be fixed to the outer peripheral region of the outer lens part 200, and the second connector member 621*a* may be configured to be movable relative to the lamp bezel part 300. In this case, the second connector member 621*a* may be moved and coupled to the first connector member 611*a***.

Meanwhile, according to the first embodiment of the present disclosure, the first connection part 610 may further include first wire members **611*b* configured to connect the first connector member 611*a* and the vibration part 400. In this case, the first wire members 611*b* may be provided to face the second outer lens region 220. In this case, it is possible to prevent the first wire member 611*b* from blocking the light emitted from the lamp 10**.

In addition, according to the first embodiment of the present disclosure, a hole region **300*a* may be formed in the lamp bezel part 300, and the second connection part 620 may further include second wire members 621*b* configured to connect the second connector member 621*a* and the drive part 500. In this case, the second wire member may penetrate the hole region 300*a***.

Figure 10:
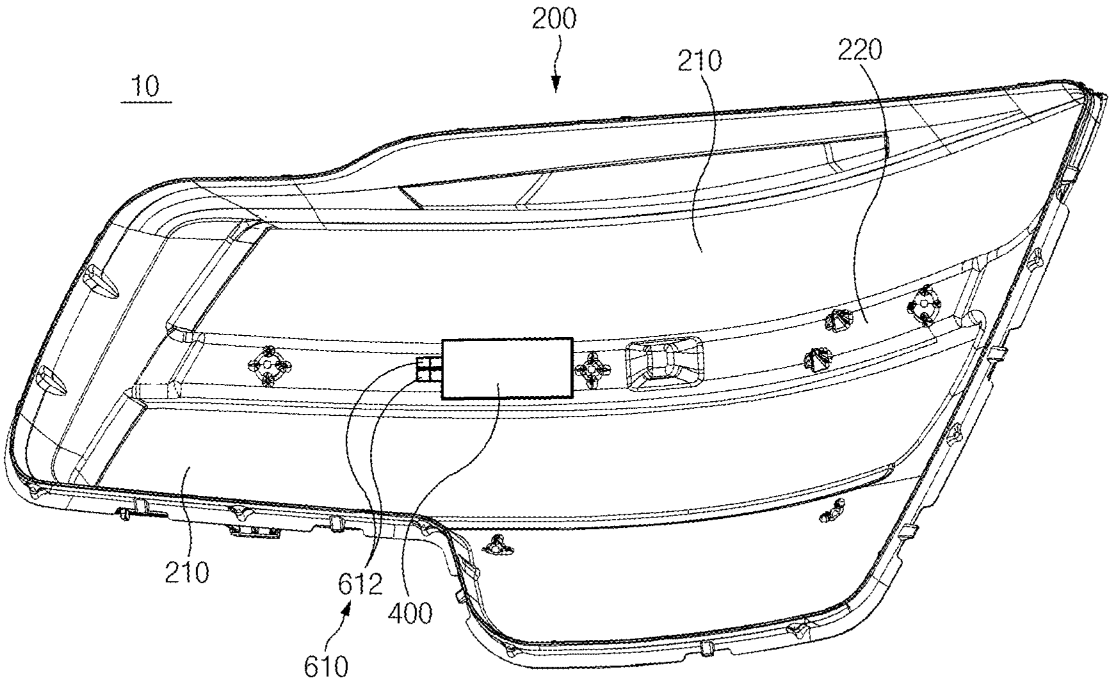
FIG. 10 is a view illustrating an outer lens part, a vibration part, and a first connection part of a lamp for a vehicle according to a second embodiment of the present disclosure.
Figure 11:
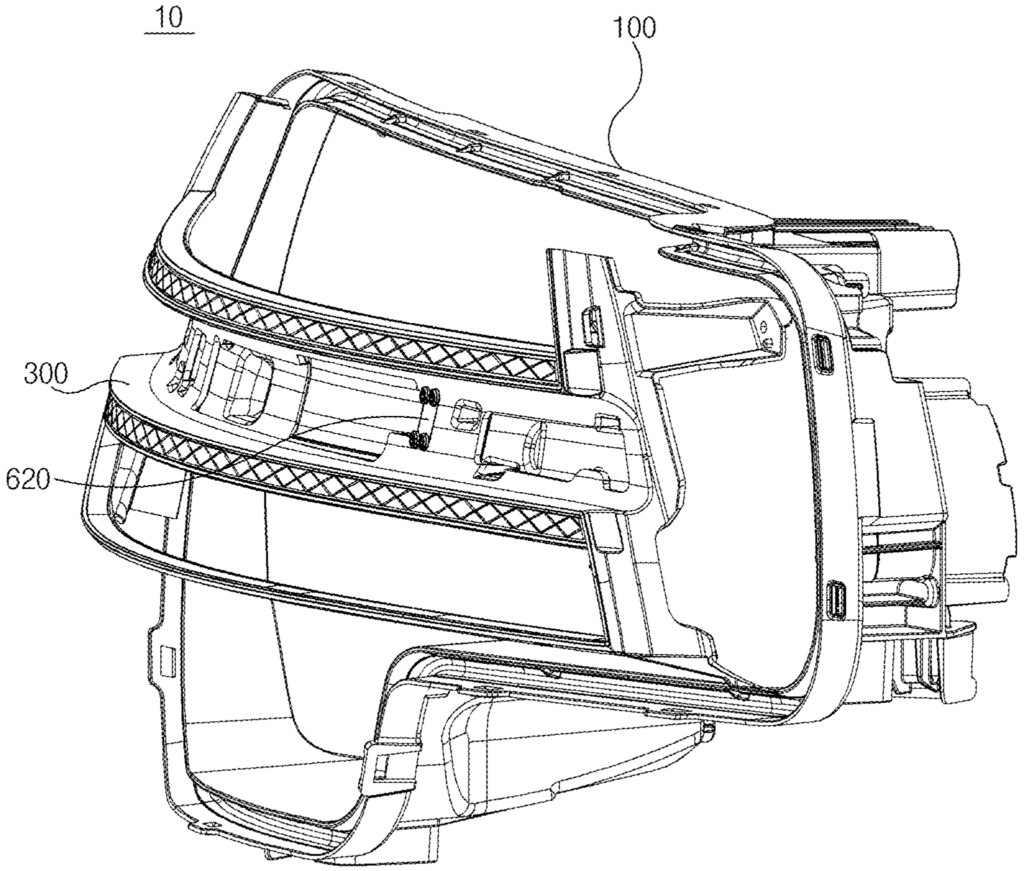
FIG. 11 is a view illustrating a lamp housing part, a lamp bezel part, a drive part, and a second connection part of the lamp for a vehicle according to the second embodiment of the present disclosure.
Figure 12:
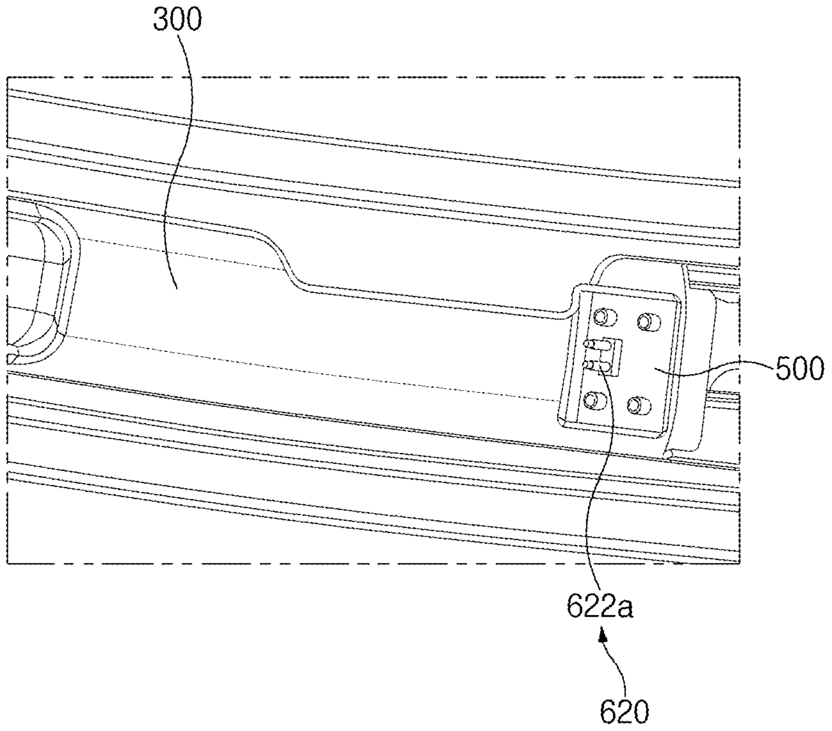
FIG. 12 is an enlarged view illustrating the drive part and the second connection part in FIG. 11.
Figure 13:
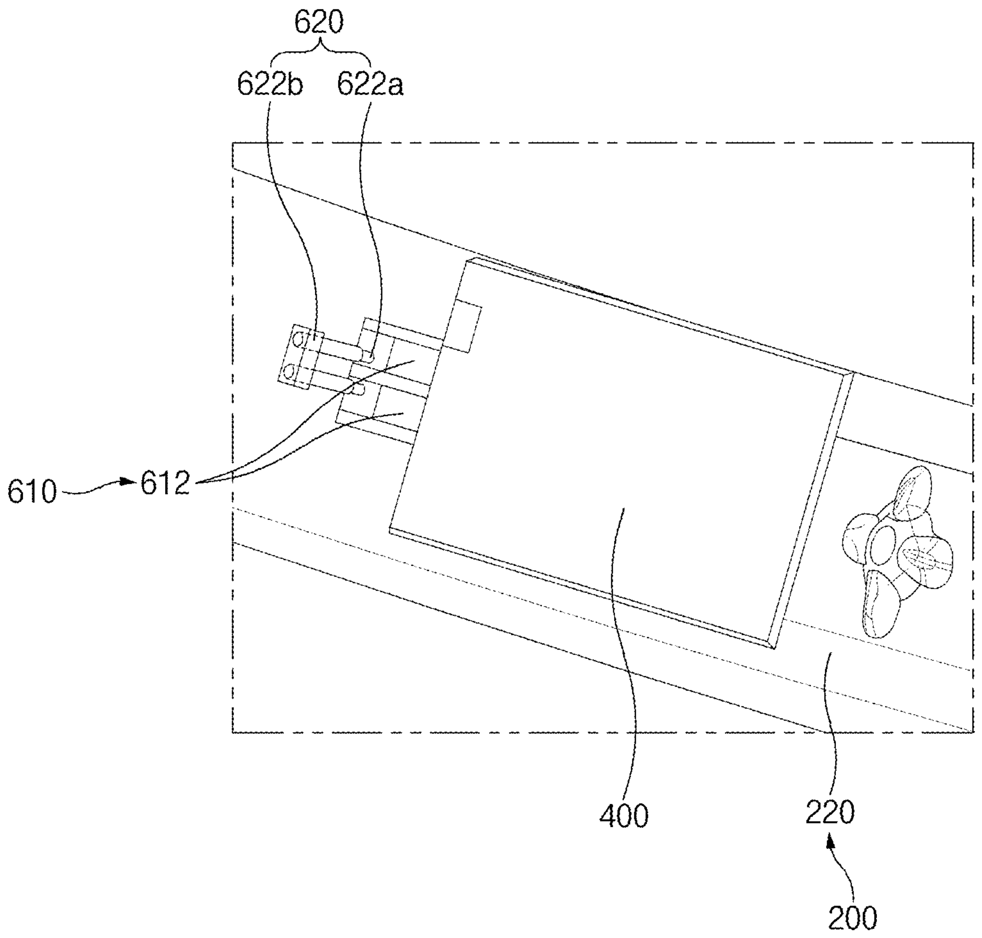
FIG. 13 is an enlarged view illustrating the first connection part and the second connection part according to the second embodiment of the present disclosure.

FIG. 10 is a view illustrating an outer lens part, a vibration part, and a first connection part of a lamp for a vehicle according to a second embodiment of the present disclosure, and FIG. 11 is a view illustrating a lamp housing part, a lamp bezel part, a drive part, and a second connection part of the lamp for a vehicle according to the second embodiment of the present disclosure. FIG. 12 is an enlarged view illustrating the drive part and the second connection part in FIG. 11, and FIG. 13 is an enlarged view illustrating the first connection part and the second connection part according to the second embodiment of the present disclosure.

As in the first embodiment of the present disclosure, the drive part 500 may be fixedly coupled to one side surface of the lamp bezel part 300 even in the second embodiment of the present disclosure. However, the second embodiment of the present disclosure differs from the first embodiment of the present disclosure in terms of detailed configurations of the first and second connection parts 610 and 620.

As illustrated in FIGS. 10 to 12, according to the second embodiment of the present disclosure, the first connection part 610 may include terminal members 612 connected to the vibration part 400, and the second connection part 620 may include pin members 622*a* configured to come into contact with the terminal members 612. That is, according to the present disclosure, the first connection part 610 and the second connection part 620 may be electrically connected to each other by the contact between the terminal members 612 and the pin members 622*a*.

More particularly, according to the second embodiment of the present disclosure, the pin member 622*a* may be pressed toward the terminal member 612. More specifically, the second connection part 620 may further include spring members 622*b* configured to press the pin members 622*a* toward the terminal members 612. For example, the second connection part 620 may be a pogo pin member.

Meanwhile, as described above, according to the second embodiment of the present disclosure, the drive part 500 may be fixedly coupled to one side surface of the lamp bezel part 300. In this case, the pin member 622*a* may be fixedly coupled to the drive part 500.

Figure 14:
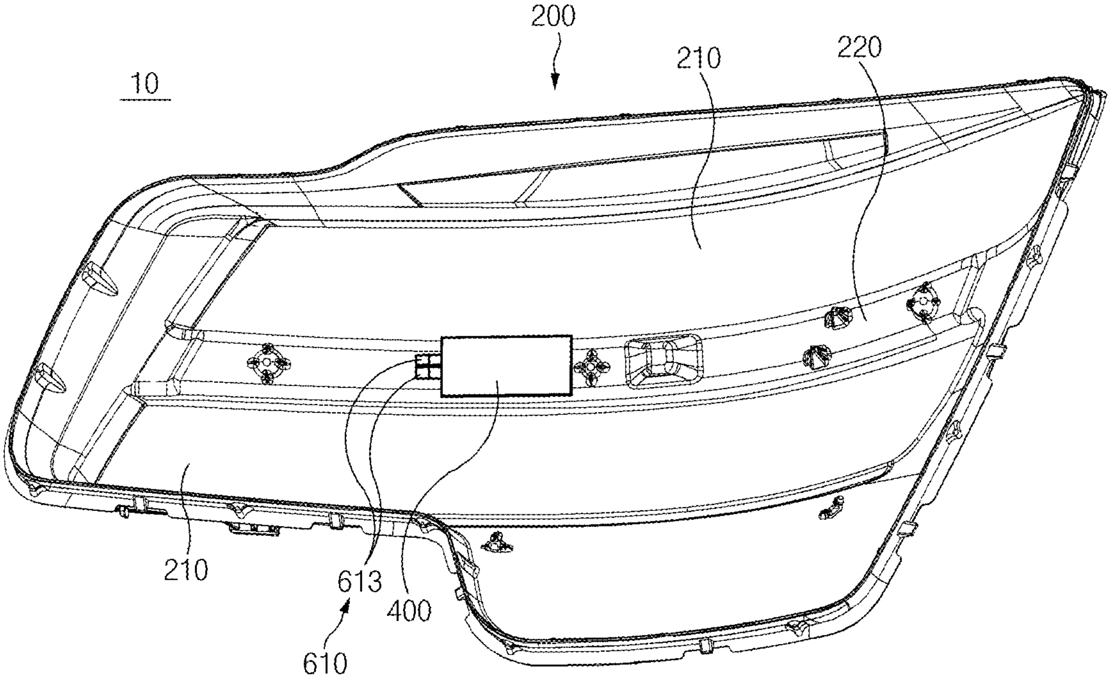
FIG. 14 is a view illustrating an outer lens part, a vibration part, and a first connection part of a lamp for a vehicle according to a third embodiment of the present disclosure.
Figure 15:
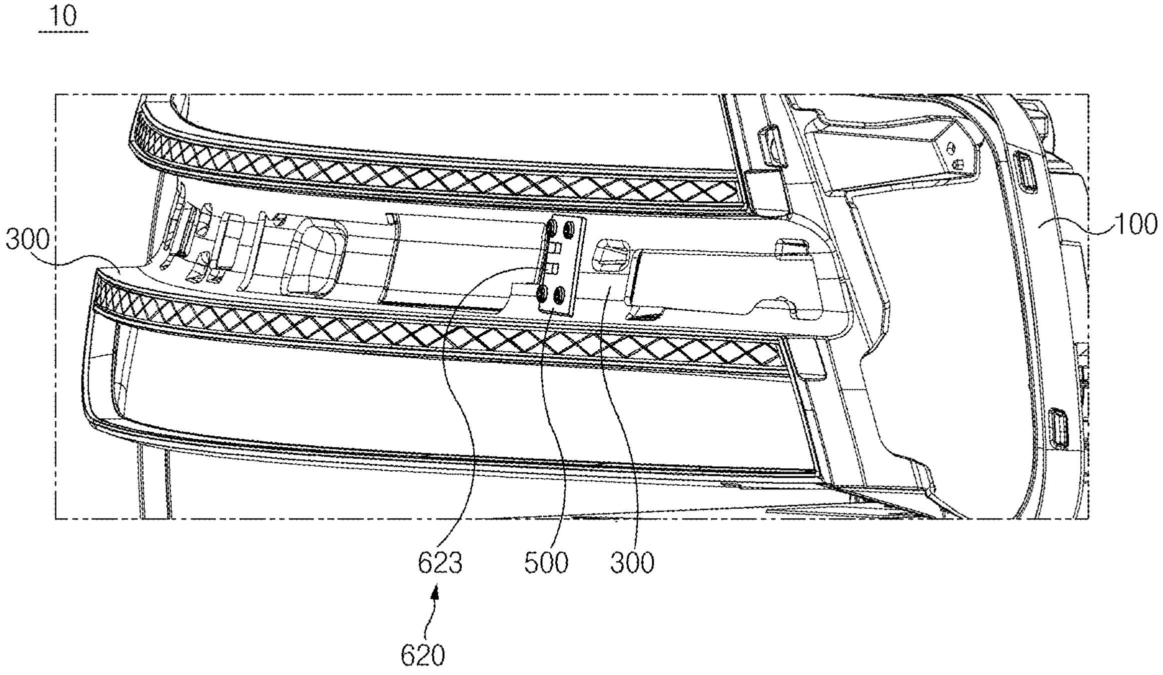
FIG. 15 is a view illustrating a lamp housing part, a lamp bezel part, a drive part, and a second connection part of the lamp for a vehicle according to the third embodiment of the present disclosure.
Figure 16:
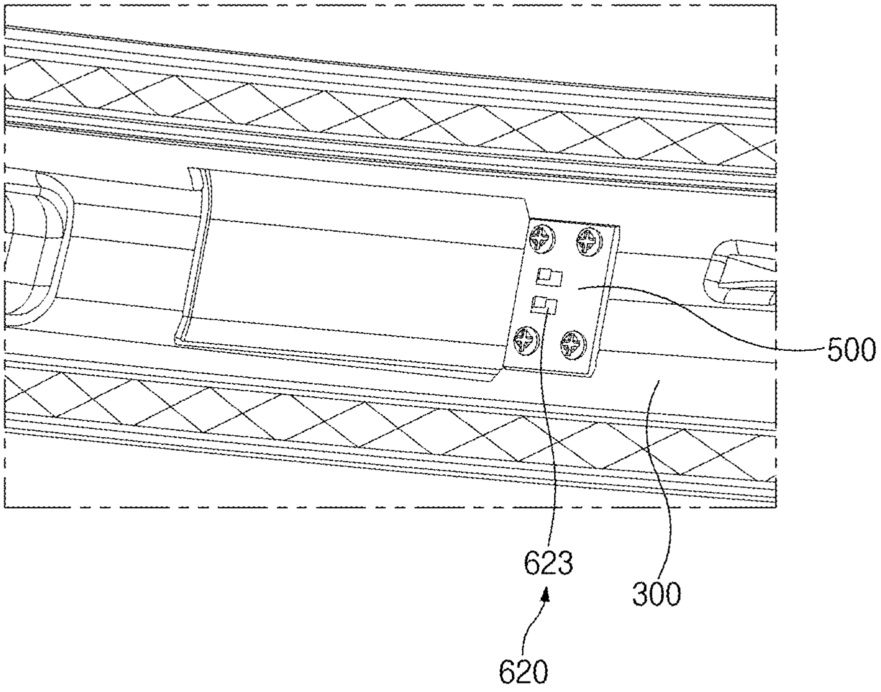
FIG. 16 is an enlarged view illustrating the drive part and the second connection part in FIG. 15.
Figure 17:
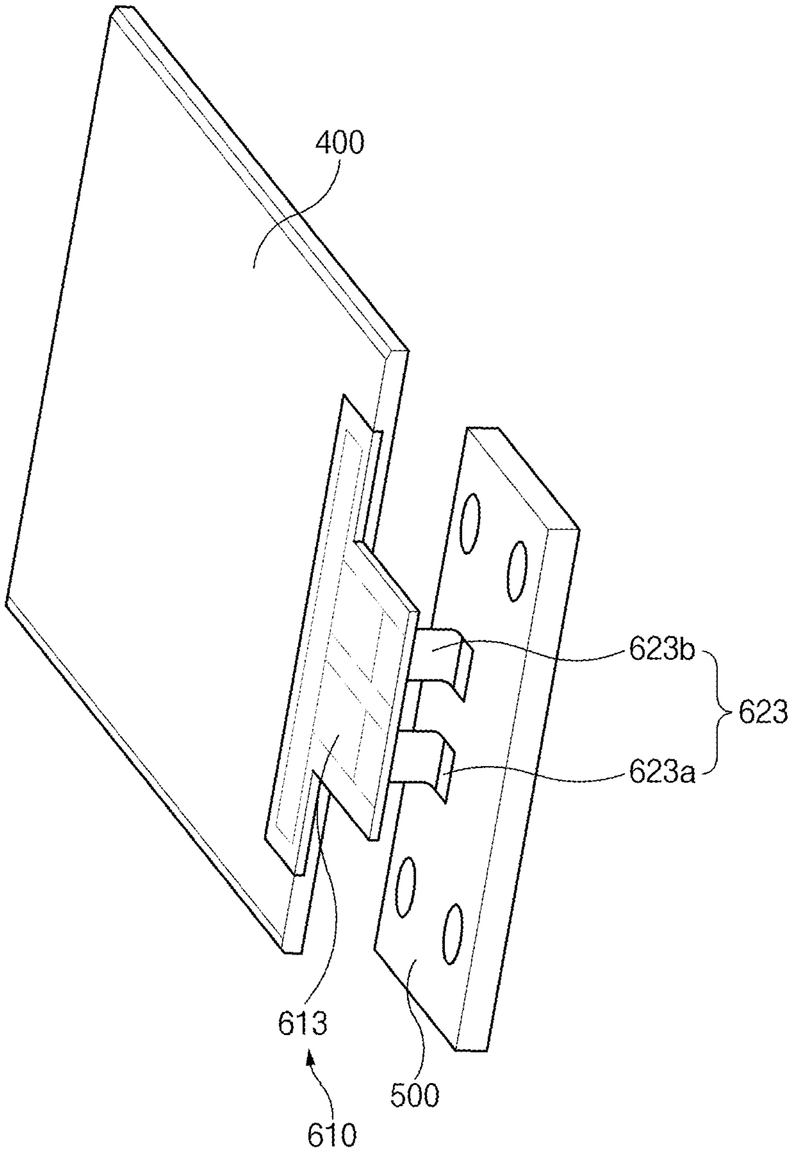
FIG. 17 is an enlarged view illustrating the first connection part and the second connection part according to the third embodiment of the present disclosure.

FIG. 14 is a view illustrating an outer lens part, a vibration part, and a first connection part of a lamp for a vehicle according to a third embodiment of the present disclosure, and FIG. 15 is a view illustrating a lamp housing part, a lamp bezel part, a drive part, and a second connection part of the lamp for a vehicle according to the third embodiment of the present disclosure. FIG. 16 is an enlarged view illustrating the drive part and the second connection part in FIG. 15, and FIG. 17 is an enlarged view illustrating the first connection part and the second connection part according to the third embodiment of the present disclosure.

As in the first and second embodiments of the present disclosure, the drive part 500 may be fixedly coupled to one side surface of the lamp bezel part 300 even in the third embodiment of the present disclosure. However, the third embodiment of the present disclosure differs from the above-mentioned embodiments of the present disclosure in terms of detailed configurations of the first and second connection parts 610 and 620.

According to the third embodiment of the present disclosure, the first connection part 610 may include terminal members 613 connected to the vibration part 400, and the second connection part 620 may include elastic pin members 623 configured to come into contact with the terminal members 613 and each having an elastically deformable geometric shape. That is, unlike the second embodiment of the present disclosure in which the pin member is pressed toward the terminal member by the elastic force of the spring member, the third embodiment of the present disclosure is characterized in that an elastic force is applied to the elastic pin member 623 by a geometric shape of the elastic pin member 623.

More specifically, according to the third embodiment of the present disclosure, the elastic pin member 623 may include a bent band shape. In this case, the band (or the elastic pin member) may include a first band region 623*a* fixed to the drive part 500, and a second band region 623*b* having a shape bent from the first band region 623*a*, and the second band region 623*b* may come into contact with the terminal member 613. Meanwhile, in the present specification, the band shape may be understood as having a predetermined shape with a constant thickness. That is, according to the third embodiment of the present disclosure, a degree to which the second band region 623*b* is bent with respect to the first band region 623*a* may vary depending on a degree to which the elastic pin member 623 presses the terminal member 613. An elastic restoring force of the elastic pin member 623 may increase as the degree to which the second band region 623*b* is bent with respect to the first band region 623*a* increases, i.e., as a force by which the terminal member 613 presses the elastic pin member 623 increases.

Figure 18:
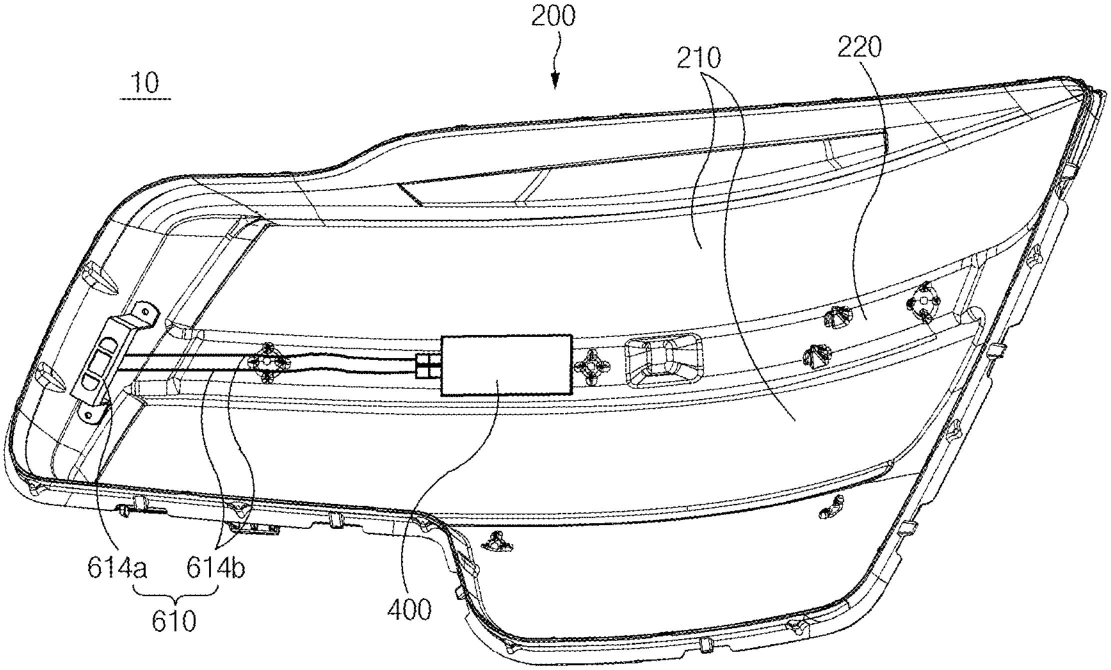
FIG. 18 is a view illustrating an outer lens part, a vibration part, and a first connection part of a lamp for a vehicle according to a fourth embodiment of the present disclosure.
Figure 19:
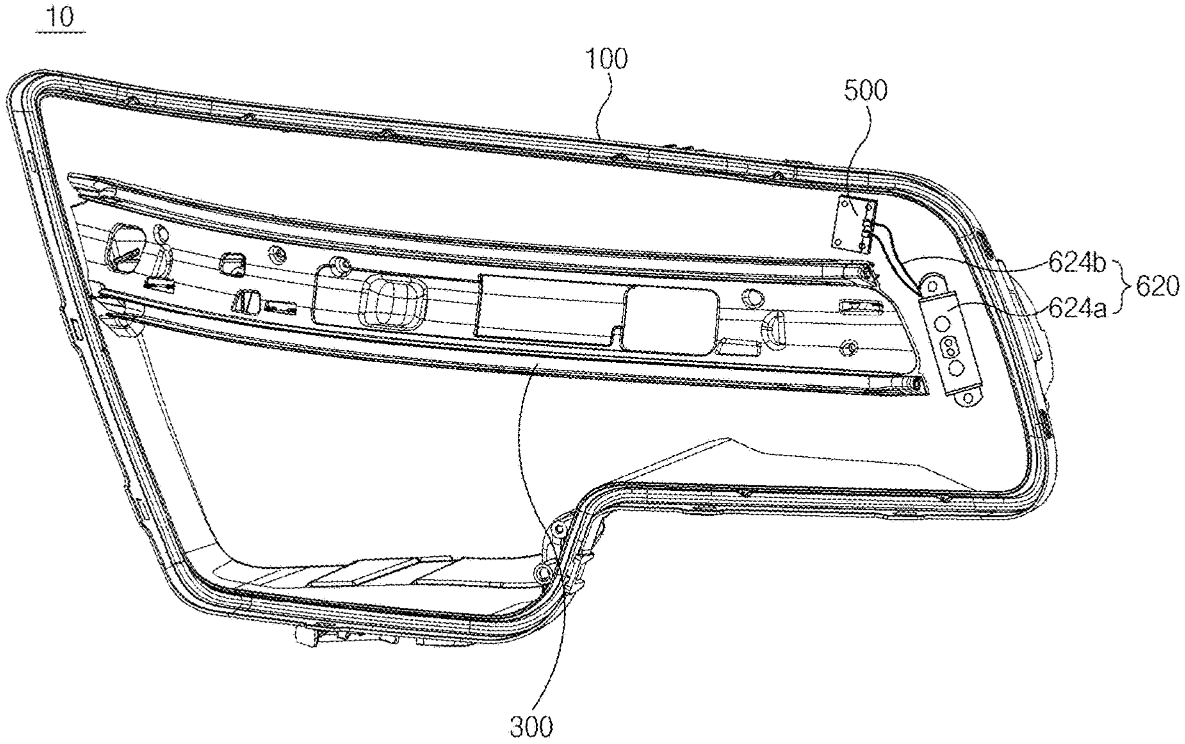
FIG. 19 is a view illustrating a lamp housing part, a lamp bezel part, a drive part, and a second connection part of the lamp for a vehicle according to the fourth embodiment of the present disclosure.
Figure 20:
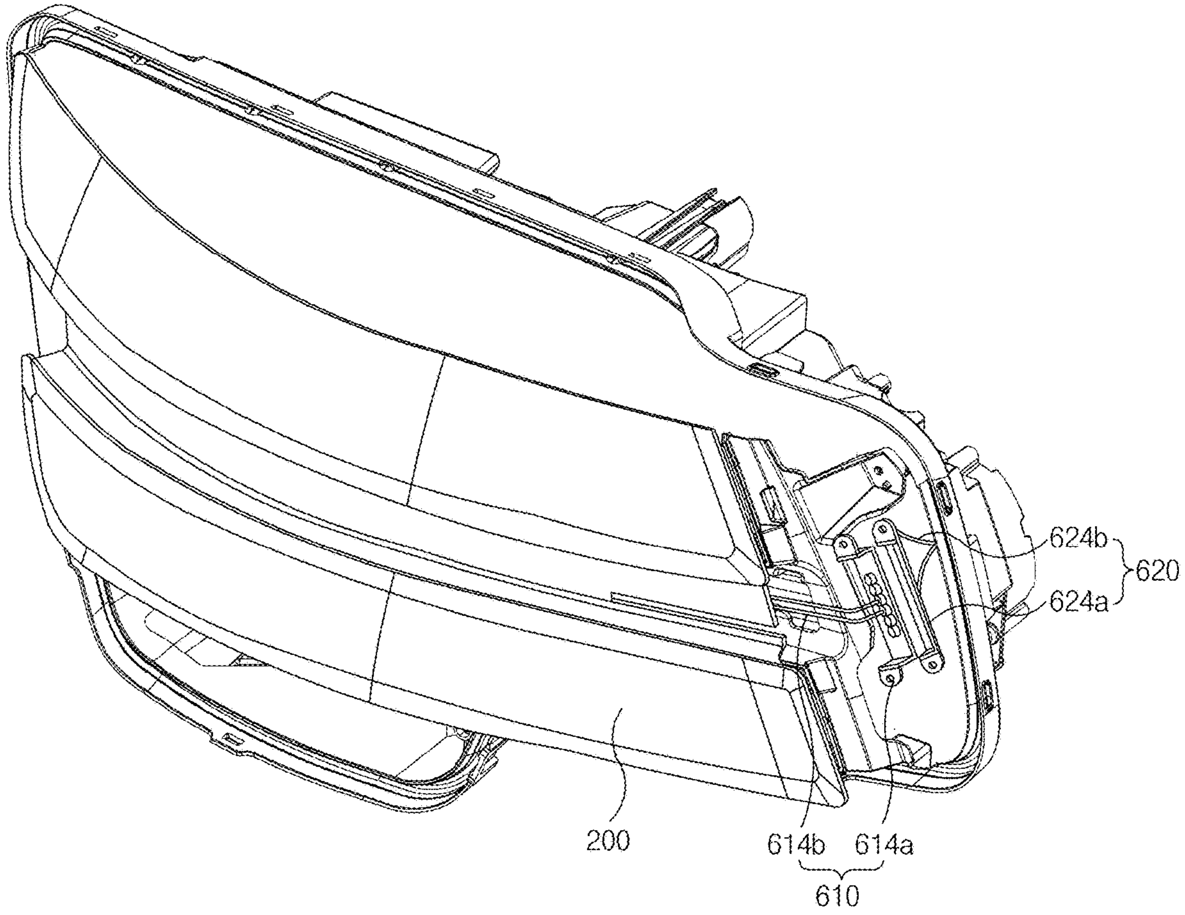
FIG. 20 is a view illustrating a state in which the first connection part and the second connection part according to the fourth embodiment of the present disclosure are coupled.
Figure 21:
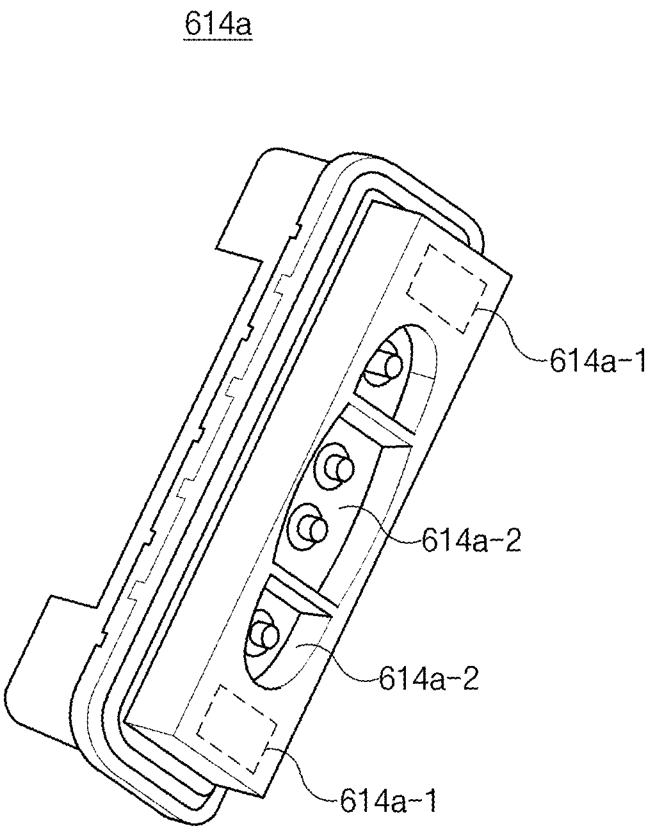
FIG. 21 is an enlarged view illustrating a first coupling member according to the fourth embodiment of the present disclosure.
Figure 22:
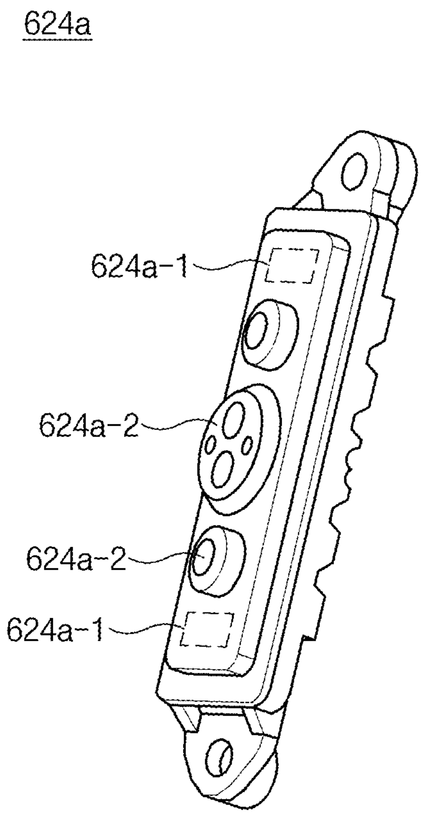
FIG. 22 is an enlarged view illustrating a second coupling member according to the fourth embodiment of the present disclosure.

FIG. 18 is a view illustrating an outer lens part, a vibration part, and a first connection part of a lamp for a vehicle according to a fourth embodiment of the present disclosure, and FIG. 19 is a view illustrating a lamp housing part, a lamp bezel part, a drive part, and a second connection part of the lamp for a vehicle according to the fourth embodiment of the present disclosure. FIG. 20 is a view illustrating a state in which the first connection part and the second connection part according to the fourth embodiment of the present disclosure are coupled, and FIG. 21 is an enlarged view illustrating a first coupling member according to the fourth embodiment of the present disclosure. Further, FIG. 22 is an enlarged view illustrating a second coupling member according to the fourth embodiment of the present disclosure.

Unlike the first to third embodiments of the present disclosure, the drive part 500 according to the fourth embodiment of the present disclosure may be fixedly coupled to one side surface of the lamp housing part 100. Furthermore, according to the fourth embodiment of the present disclosure, the first connection part 610 and the second connection part 620 may be coupled to each other by a magnetic force. More specifically, the first connection part 610 may include a first coupling member 614*a* including first magnet regions 614*a*-1, and the second connection part 620 may include a second coupling member 624*a* including second magnet regions 624*a*-1 configured to be attached to the first magnet regions 614*a*-1 by a magnetic force. More specifically, the first magnet region 614*a*-1 and the second magnet region 624*a*-1 may have different polarities in a region in which the first magnet region 614*a*-1 and the second magnet region 624*a*-1 face each other.

In addition, according to the fourth embodiment of the present disclosure, the first coupling member 614*a* may be provided to face the outer peripheral region of the outer lens part 200, and the second coupling member 624*a* may be provided outside the lamp bezel part 300. More particularly, the first coupling member 614*a* may be fixed to the outer peripheral region of the outer lens part 200.

Meanwhile, similar to the first embodiment of the present disclosure, even in the fourth embodiment of the present disclosure, the first connection part 610 may further include first wire members 614*b* configured to connect the first coupling member 614*a* and the vibration part 400, and the second connection part 620 may further include second wire members 624*b* configured to connect the second coupling member 624*a* and the drive part 500. In this case, the first wire member 614*b* may be provided to face the second outer lens region 220 (see FIG. 1). In this case, it is possible to prevent the first wire member 614*b* from blocking the light emitted from the lamp 10.

With continued reference to FIGS. 18 to 22, first concave-convex regions 614*a*-2 each having a concave-convex shape may be provided in a region of the first coupling member 614*a* facing the second coupling member 624*a*, and second concave-convex regions 624*a*-2, which each have a shape corresponding to the first concave-convex region 614*a*-2, may be provided in a region of the second coupling member 624*a* facing the first coupling member 614*a*. In this case, the first concave-convex region 614*a*-2 and the second concave-convex region 624*a*-2 may be coupled to engage with each other. In this case, it is possible to effectively prevent a situation in which the first coupling member 614*a* and the second coupling member 624*a* slip relative to each other and are spaced apart from each other.

Figure 23:
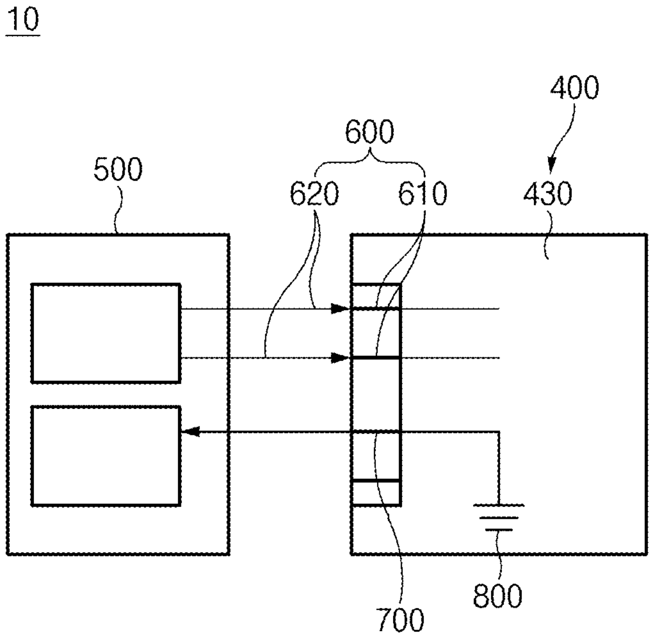
FIG. 23 is a view illustrating an example of a structure for identifying an assembled state of the lamp for a vehicle in a vehicle according to the present disclosure.
Figure 24:
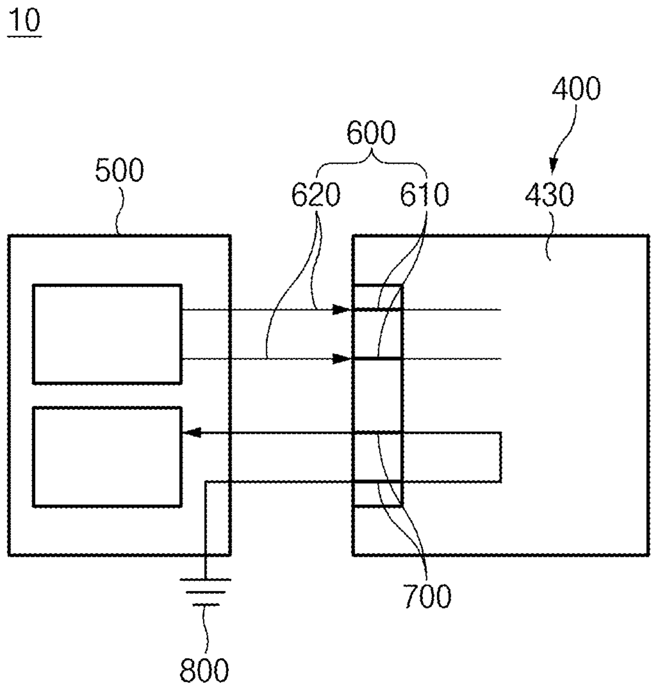
FIG. 24 is a view illustrating another example of a structure for identifying an assembled state of the lamp for a vehicle in the vehicle according to the present disclosure.

FIG. 23 is a view illustrating an example of a structure for identifying an assembled state of the lamp for a vehicle in a vehicle according to the present disclosure, and FIG. 24 is a view illustrating another example of a structure for identifying an assembled state of the lamp for a vehicle in the vehicle according to the present disclosure.

Meanwhile, according to the present disclosure, the lamp for a vehicle may further include a separate configuration capable of identifying whether the first connection part 610 and the second connection part 620 are coupled properly.

More specifically, the lamp according to the present disclosure may further include a connection identification terminal member 700 provided at one side of the vibration part 400, and a grounding part 800 electrically connected to the connection identification terminal member 700. That is, according to the present disclosure, the physical contact between the drive part 500 and the connection identification terminal member 700 or the physical contact between the connection identification terminal member 700 and another electronic component (e.g., an MCU) other than the drive part are detected, such that it is possible to identify whether the first connection part 610 and the second connection part 620 are coupled properly. Therefore, according to the present disclosure, in case that the first connection part 610 and the second connection part 620 are coupled to each other, the connection identification terminal member 700 may automatically come into contact with the drive part 500 or another electronic component. Therefore, the case in which the lamp according to the present disclosure includes the connection identification terminal member 700 and the grounding part 800 may suit the second and third embodiments of the present disclosure in which the terminal member is connected to the vibration part.

Meanwhile, for example, as illustrated in FIG. 23, the above-mentioned grounding part 800 may be provided in the vibration part 400. For example, the vibration part 400 may further include a substrate member 430 on which a first electrode and a second electrode are provided. The above-mentioned grounding part 800 may be fixed to the substrate member 430. In this case, in case that the connection identification terminal member 700 comes into contact with the drive part 500 or another electronic component, a contact signal may be immediately transmitted from the vibration part 400 to the drive part 500 or another electronic component.

In contrast, as illustrated in FIG. 24, according to another example, the grounding part 800 may be provided outside the vibration part 400. For example, the vibration part 400 may be provided in the drive part 500 or another electronic component (e.g., the MCU). In this case, in case that the connection identification terminal member 700 comes into contact with the drive part 500 or another electronic component, the contact signal may be transmitted to the drive part 500 or another electronic component through the grounding part 800 and the vibration part 400. In particular, in case that the grounding part 800 is provided in the drive part 500 or another electronic component, the above-mentioned contact signal may sequentially pass through i) the drive part or another electronic component, ii) the vibration part 400, and iii) the drive part or another electronic component. In this case, the connection identification terminal member 700 may be provided on two portions, i.e., i) a portion that connects the grounding part 800 and the vibration part 400 and ii) a portion that connects the vibration part 400 and the drive part 500.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

DESCRIPTION OF REFERENCE NUMERALS

10: Lamp for vehicle
100: Lamp housing part
200: Outer lens part
210: First outer lens region
220: Second outer lens region
300: Lamp bezel part
400: Vibration part
410: Piezoelectric element
421: First electrode
422: Second electrode
430: Substrate member
500: Drive part
600: Connection part
610: First connection part
611*a*: First connector member
611*b*: Second connector member
612, 613: Terminal member
614*a*: First coupling member
614*a*-1: First magnet region
614*a*-2: First concave-convex region
614*b*: First wire member
620: Second connection part
621*a*: Second connector member
621*b*: Second wire member
622*a*: Pin member
622*b*: Spring member
623: Elastic pin member
623*a*: First band region
623*b*: Second band region
624*a*: Second coupling member
624*a*-1: Second magnet region
624*a*-2: Second concave-convex region
624*b*: Second wire member
700: Connection identification terminal member
800: Grounding part

What is claimed is:

1. A lamp for a vehicle, the lamp comprising:
a lamp housing part including an internal space configured to accommodate a light source;
an outer lens part coupled to one side of the lamp housing part and configured to cover the internal space;
a vibration part fixed to the outer lens part;
a drive part provided at one side of the vibration part and configured to operate the vibration part by transmitting an electrical signal to the vibration part; and
a connection part configured to electrically connect the vibration part and the drive part,
wherein the vibration part comprises:
a polarized piezoelectric element; and
first and second electrodes provided to respectively face two opposite sides based on a direction in which the piezoelectric element is polarized, wherein the piezoelectric element outputs a sound by being vibrated by a change over time in voltage applied to the first and second electrodes, wherein the connection part comprises:

a first connection part having one side connected to the vibration part; and a second connection part having one side connected to the drive part, and wherein the first connection part and the second connection part are coupled to each other while being in contact with each other.

2. The lamp of claim 1, wherein the drive part is fixedly coupled to one side surface of the lamp bezel part.

3. The lamp of claim 1, wherein the drive part is fixedly coupled to one side surface of the lamp housing part.

4. The lamp of claim 1, wherein the first connection part comprises a first connector member, and wherein the second connection part comprises a second connector member detachably provided on the first connector member.

5. The lamp of claim 4, wherein the first connector member is provided to face an outer peripheral region of the outer lens part, and wherein the second connector member is provided outside the lamp bezel part.

6. The lamp of claim 4, wherein the first connector member is fixed to an outer peripheral region of the outer lens part.

7. The lamp of claim 4, wherein the first connector member is provided to face an outer peripheral region of the outer lens part, wherein the outer lens part comprises:

a first outer lens region having a transmittance rate for visible rays that is a first transmittance rate; and a second outer lens region having a transmittance rate for visible rays that is a second transmittance rate lower than the first transmittance rate, wherein the first connection part further comprises a first wire member configured to connect the first connector member and the vibration part, and wherein the first wire member is provided to face the second outer lens region.

8. The lamp of claim 4, wherein the second connector member is provided outside the lamp bezel part, wherein a hole region is formed in the lamp bezel part, wherein the second connection part further comprises a second wire member configured to connect the second connector member and the drive part, and wherein the second wire member penetrates the hole region.

9. The lamp of claim 1, wherein the first connection part comprises a terminal member connected to the vibration part, and wherein the second connection part comprises a pin member configured to come into contact with the terminal member.

10. The lamp of claim 9, wherein the second connection part further comprises a spring member configured to press the pin member toward the terminal member.

11. The lamp of claim 9, wherein the pin member is fixedly coupled to the drive part.

12. The lamp of claim 1, wherein the first connection part comprises a terminal member connected to the vibration part, and wherein the second connection part comprises an elastic pin member configured to come into contact with the terminal member and having an elastically deformable geometric shape.

13. The lamp of claim 12, wherein the elastic pin member comprises a bent band shape, wherein the band comprises:

a first band region fixed to the drive part; and a second band region having a shape bent from the first band region, and wherein the second band region is configured to come into contact with the terminal member.

14. The lamp of claim 1, wherein the first connection part comprises a first coupling member comprising a first magnet region, and wherein the second connection part comprises a second coupling member comprising a second magnet region configured to be attached to the first magnet region by a magnetic force.

15. The lamp of claim 14, wherein the first coupling member is provided to face an outer peripheral region of the outer lens part, and wherein the second coupling member is provided outside the lamp bezel part.

16. The lamp of claim 14, wherein the first coupling member is fixed to an outer peripheral region of the outer lens part.

17. The lamp of claim 14, wherein the first coupling member is provided to face an outer peripheral region of the outer lens part, wherein the outer lens part comprises:

a first outer lens region having a transmittance rate for visible rays that is a first transmittance rate; and a second outer lens region having a transmittance rate for visible rays that is a second transmittance rate lower than the first transmittance rate, wherein the first connection part further comprises a first wire member configured to connect the first coupling member and the vibration part, and wherein the first wire member is provided to face the second outer lens region.

18. The lamp of claim 14, wherein a first concave-convex region having a concave-convex shape is provided in a region of the first coupling member facing the second coupling member, wherein a second concave-convex region having a shape corresponding to the first concave-convex region, is provided in a region of the second coupling member facing the first coupling member, and wherein the first concave-convex region and the second concave-convex region are coupled to engage with each other.

19. The lamp of claim 1, further comprising:

a connection identification terminal member provided at one side of the vibration part; and a grounding part electrically connected to the connection identification terminal member, wherein the grounding part is either provided in the vibration part or outside the vibration part.

20. A lamp for a vehicle, the lamp comprising:

a lamp housing part including an internal space configured to accommodate a light source;

an outer lens part coupled to one side of the lamp housing part and configured to cover the internal space;

a vibration part fixed to the outer lens part;

a drive part provided at one side of the vibration part;

a connection part configured to electrically connect the vibration part and the drive part; and a controller configured to control the drive part to operate the vibration part;

wherein the vibration part comprises:

a polarized piezoelectric element; and first and second electrodes provided to respectively face two opposite sides based on a direction in which the piezoelectric element is polarized, wherein the piezoelectric element outputs a sound by being vibrated by a change over time in voltage applied to the first and second electrodes, wherein the connection part comprises:

a first connection part having one side connected to the vibration part; and a second connection part having one side connected to the drive part, and wherein the first connection part and the second connection part are coupled to each other while being in contact with each other.

* * * * *